United States Patent [19]
Yore

[11] Patent Number: 5,615,715
[45] Date of Patent: Apr. 1, 1997

[54] CONTAINER FLUID REMOVAL AND RECOVERY SYSTEM

[75] Inventor: John W. Yore, Riverview, Fla.

[73] Assignee: Rainbow Recovery, Inc., Gibsonton, Fla.

[21] Appl. No.: 604,709

[22] Filed: Feb. 21, 1996

Related U.S. Application Data

[63] Continuation of Ser. No. 228,212, Apr. 15, 1994, abandoned.

[51] Int. Cl.$^6$ .................................................. B65B 31/00
[52] U.S. Cl. .................................. 141/51; 141/1; 141/65; 141/7; 141/330; 222/87
[58] Field of Search ........................... 141/1, 7, 51, 65, 141/98, 329, 330; 222/87; 414/412

[56] References Cited

U.S. PATENT DOCUMENTS

| | | | |
|---|---|---|---|
| 2,496,606 | 2/1950 | Smith | 222/87 |
| 4,349,054 | 9/1982 | Chipman et al. | 141/1 |
| 4,407,341 | 10/1983 | Feldt et al. | 141/97 |
| 4,459,906 | 7/1984 | Cound et al. | 100/45 |
| 4,508,356 | 4/1985 | Janian | 277/205 |
| 4,944,333 | 7/1990 | Gold et al. | 141/51 |
| 5,067,529 | 11/1991 | Gonzalez-Miller | 141/7 |
| 5,114,043 | 5/1992 | Collins, Jr. | 222/86 |
| 5,163,585 | 11/1992 | Campbell | 222/5 |
| 5,181,462 | 1/1993 | Isaac | 100/98 R |
| 5,213,031 | 5/1993 | Hebbert | 100/98 R |
| 5,220,947 | 6/1993 | Cauquil et al. | 141/91 |
| 5,332,009 | 7/1994 | Van Etten | 141/7 |

FOREIGN PATENT DOCUMENTS

9207763  5/1992  WIPO ..................... 141/51

*Primary Examiner*—J. Casimer Jacyna
*Attorney, Agent, or Firm*—C. Douglas McDonald, Jr. & Associates, P.A.

[57] ABSTRACT

Pressurized containers are sorted into a certain repeated alignment and pushed in series through a controlled pressure chamber which is maintained at pressure lower than the pressure within the containers and is sealed against pressure leakage to the exterior as the containers are introduced and moved therethrough. Within the sealed chamber the containers are pierced and heated so that fluids in the pressurized containers exit into the sealed chamber for removal and recovery from the sealed chamber. After traveling through the chamber the pressurized containers pass through an exit seal and are collected for disposal,

27 Claims, 12 Drawing Sheets

CONTAINER FLUID REMOVAL AND RECOVERY SYSTEM

RELATED APPLICATION

This application is a continuation of application Ser. No. 08/228,212 filed Apr. 15, 1994, by John W. Yore and entitled "Container Fluid Removal and Recovery System," now abandoned.

FIELD OF THE INVENTION

This invention relates to puncturing devices for aerosol containers or pressurized containers, specifically to such puncturing devices that are used to relieve the pressure of residual gas within a pressurized container and for releasing for collection the residual contents within a pressurized container.

BACKGROUND OF INVENTION

Aerosol containers and other pressurized containers have widespread usage in pharmaceuticals, homes and industries. When disposing of such containers, both safety and environmental hazards are encountered. A safety hazard is encountered when heating the containers excessively or when crushing the containers, as both of these actions can cause the container to explode. An environmental hazard may exist when the residual contents released from these containers are among those regulated by the Environmental Protection Agency (EPA). The EPA regulations mandate that certain businesses and industries dispose of the contents of such containers according to EPA guidelines. In the case of aerosol pharmaceuticals, the FDA mandates guidelines for disposal of the containers. Whether or not the contents of such containers are in fact regulated, the EPA and/or the FDA mandates that all pressurized containers be punctured prior to disposal.

When the EPA and/or the FDA regulates the contents of the container, as is the case with chlorofluorocarbons, such as Freon, mere puncturing is not sufficient. Guidelines also require that the fluids removed from the punctured containers be stored and not be allowed to escape into the atmosphere. Several puncturing devices currently exist, but they do not maintain a sealed environment, do not allow rapid mass processing of pressurized containers, do not completely empty the containers, or do not collect escaping fluids including gases.

Specifically, present recovery and removal devices for pressurized containers have so far suffered from the following disadvantages:

1. A small number of punctures are created, and/or the punctures are ineffectively placed for removal of liquids.

2. Gases are not restrained from escaping into the atmosphere.

3. Only a certain size of container can be punctured.

4. The disclosed process empties one container at a time and is therefore not effective for bulk removal and recovery.

5. The gases to be removed are intermixed with compressed air rather than evacuated, permitting hazardous gases and fluids to remain in diluted form in the container.

6. Removed gases and fluids are not recovered into storage containers, thereby failing to meet EPA and/or FDA guidelines in some cases.

7. The emptied containers are not collected into storage bins for efficient disposal in an industrial setting.

SUMMARY OF THE INVENTION

In view of the foregoing, it is the object of the present invention to provide an economical method of removing fluids from pressurized containers.

To achieve these and other objects that will become readily apparent to those skilled in the art, this invention provides a method of removing fluid from sealed, pressurized containers by introducing the containers into the interior of a chamber with an internal pressure lower than that within the pressurized containers through a first end of the chamber and sealingly engaging the exterior of each such container as it is introduced into the chamber to prevent leakage of pressure between the interior of the chamber and the exterior environment, forming at least one opening in each such container sufficient to permit fluids inside the pressurized container to exit the container through said opening, guiding the opened container along a continuous path within the chamber while the pressure within the chamber is maintained lower than that within the containers so that fluid in the opened container passing through the chamber will flow into the chamber, and removing the containers from a second end of the chamber while sealingly engaging the exterior of each container to prevent leakage of pressure between the interior of the chamber and the exterior environment.

BRIEF DESCRIPTION OF THE DRAWINGS

Particularly preferred embodiments of the method and apparatus of this invention will be described in detail below in connection with the drawings in which.

DESCRIPTION OF PREFERRED EMBODIMENTS

A preferred embodiment of the apparatus incorporating the method steps of a preferred method of this invention is illustrated in FIGS. 1 through 18.

Container Flow Through the Present Invention

Figure 1:
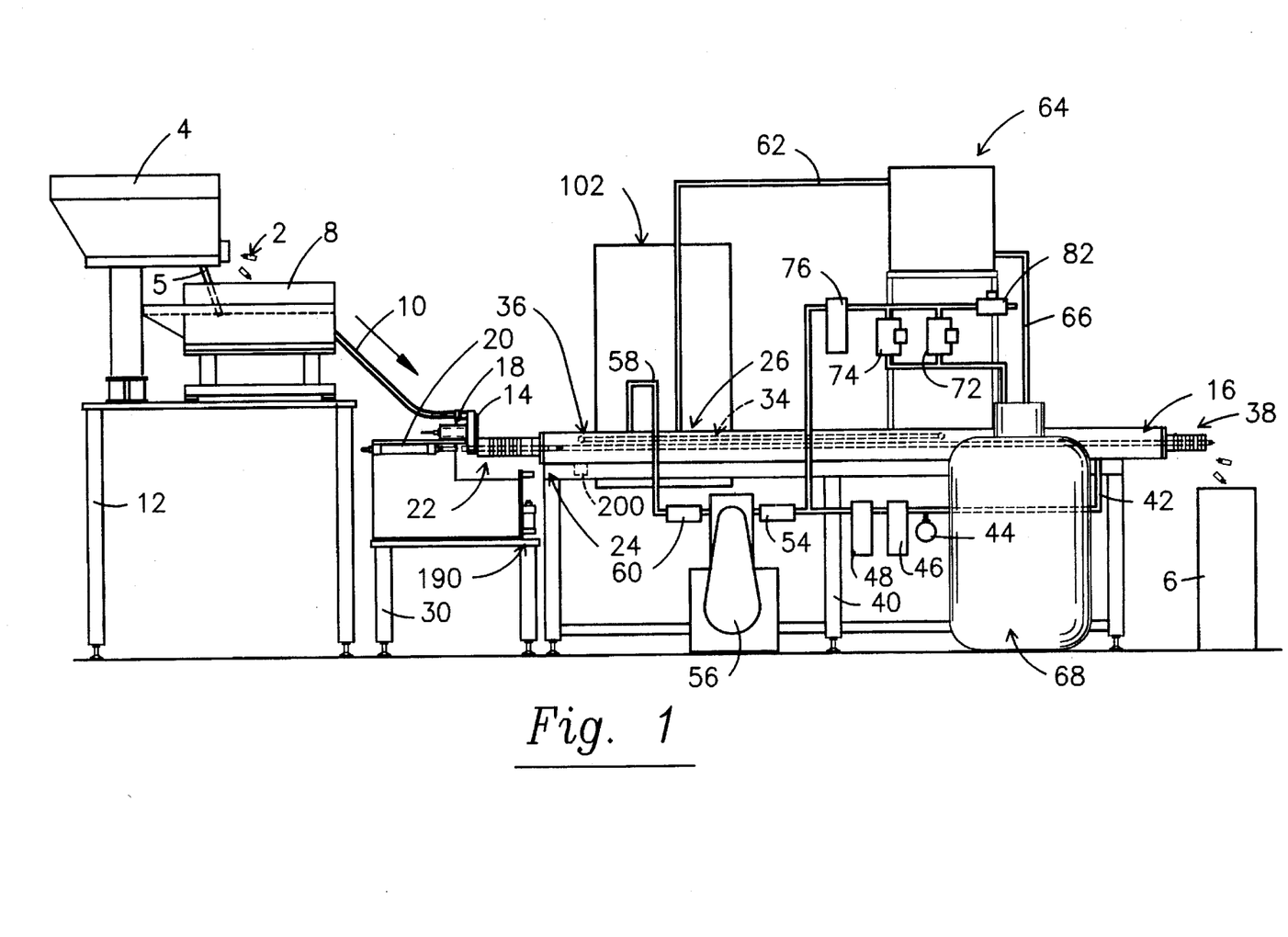
FIG. 1 is a side elevation of a preferred embodiment of the apparatus for practicing the method of this invention, showing container travel from feed hopper to disposal bin through the present invention.
Figure 2:
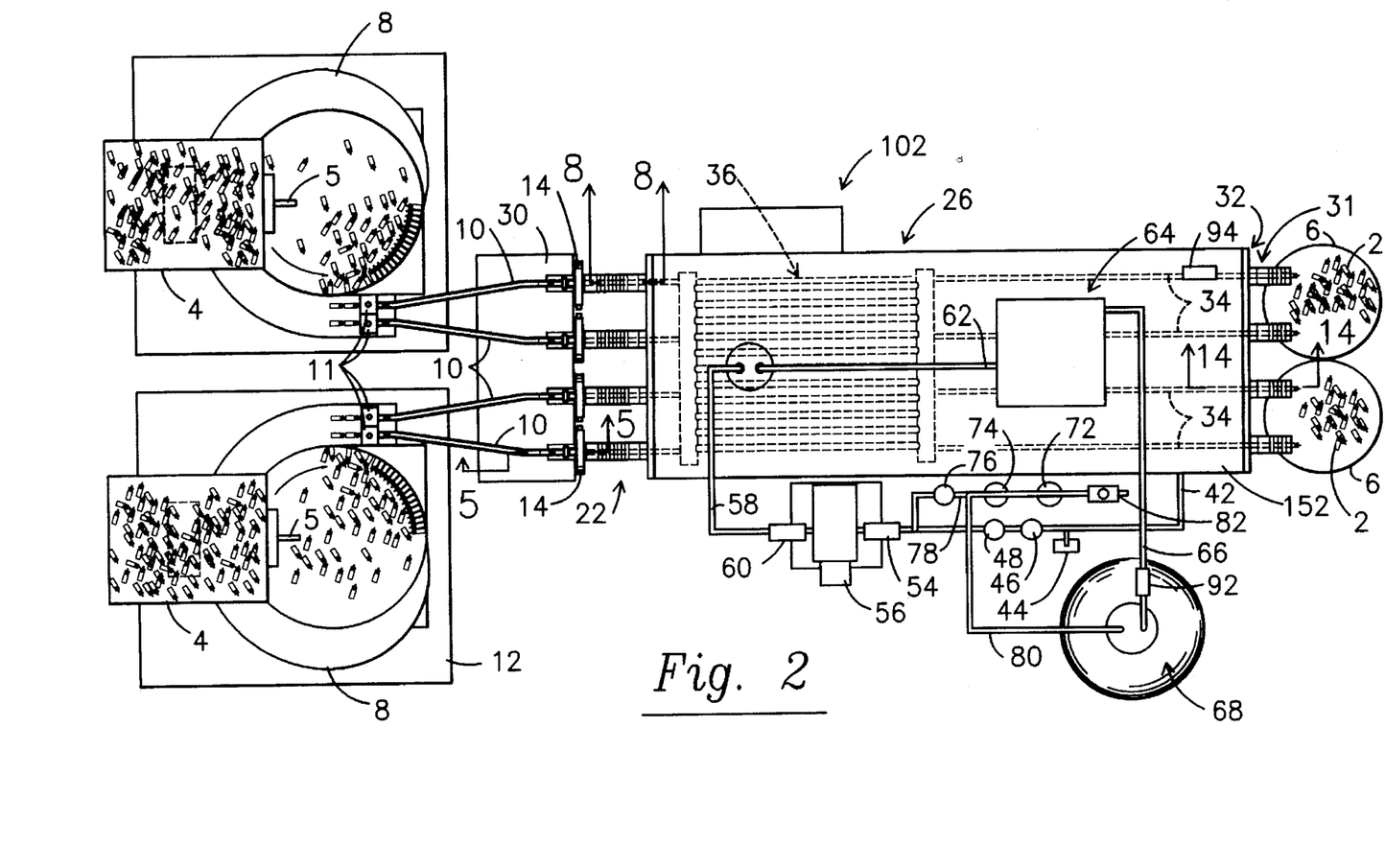
FIG. 2 is a plan view of the apparatus of FIG. 1.

FIG. 1 shows a side elevation of a preferred embodiment of the apparatus of this invention, showing the flow of containers, generally indicated as 2, through the present invention, starting with the input or feed hopper 4 and ending in the collecting bin 6 for subsequent disposal. FIG. 2 is a top plan view of the apparatus of the present invention. The input hopper 4 feeds into a conventional feeding or dispensing apparatus, which preferably may be a vibratory feeder 8, and in a preferred embodiment involves well-known means capable of automatically detecting when the vibratory feeder 8 does not have sufficient containers 2. When the input hopper 4 receives a signal that the vibratory feeder 8 has an insufficient number of containers 2 in it from the insufficient containers sensor 5, the input hopper 4 automatically dispenses more containers 2 with no particular order or alignment, using any well known automatic means for dispensing available to the art, including, for example, vibrating the input hopper 4 or tilting the input hopper 4.

The vibratory feeder 8 is maintained at a minimum level of container content by the input hopper 4. The vibratory feeder 8 uses vibration to produce motion of the contents across dropthrough slots so that containers 2 that emerge are arranged into the required valve-first alignment in the slide 10.

Figure 5:
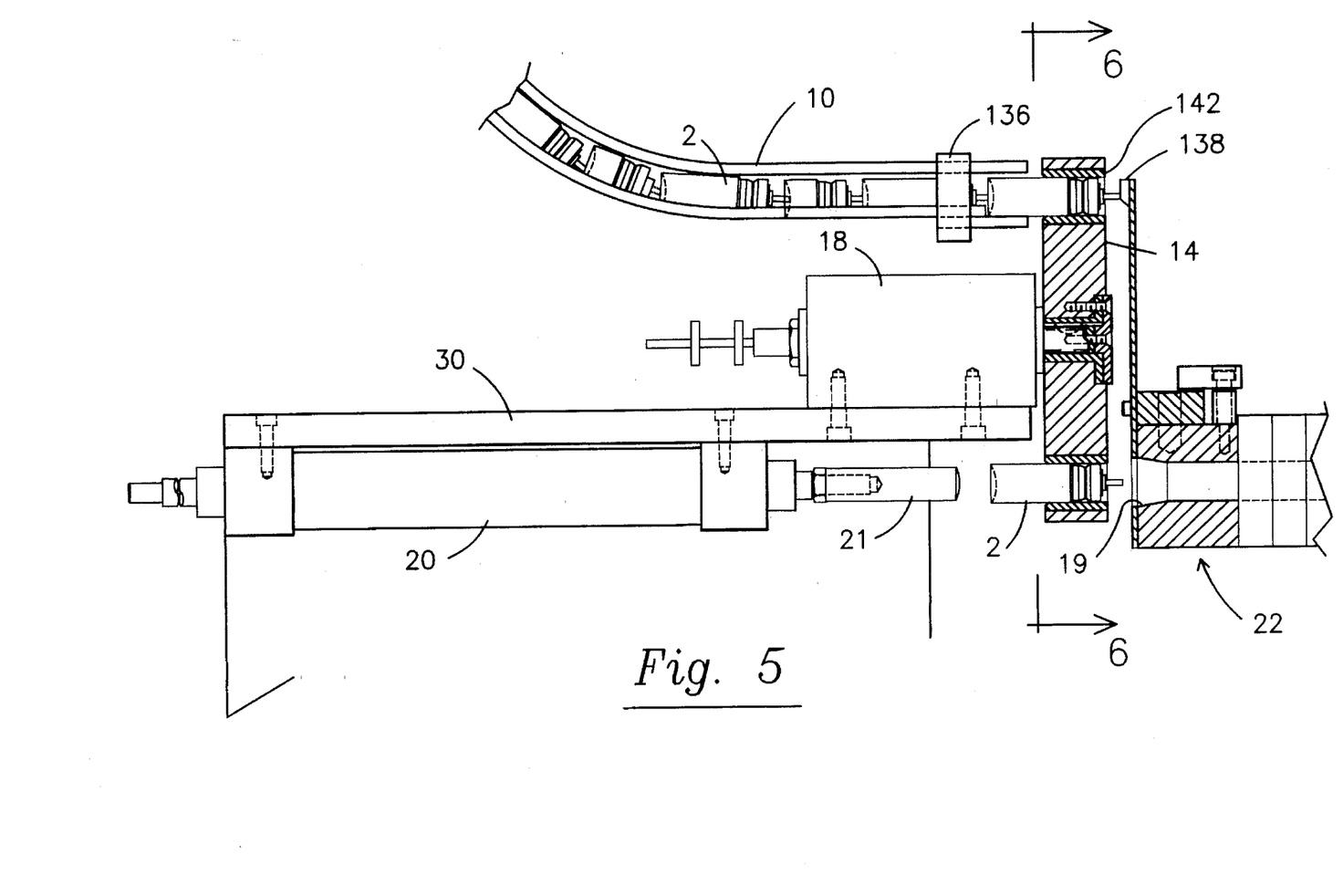
FIG. 5 is a partial side sectional view of the feed slide, alignment rotor, and pushing piston, of the present invention, taken along line 5—5 of FIG. 2 and shown at a larger scale for clarity.

As can be seen from FIG. 5, a partial side sectional view of the feed slide 10 and rotor 14, from the vibratory feeder 8 containers 2 travel valve first down the slide 10 to the rotor 14 for introduction into the fluid removing apparatus. Although the slide 10 is a convenient means for conducting containers 2 from the vibratory feeder 8 to the rotor 14, any other conventional means for conducting the containers 2 may be used. In this embodiment the rotor 14 is suitably driven by a rotary actuator 18 to periodically oscillate between a position in which container gripper 142 is aligned with the slide 10 and a position in which container gripper 142 is aligned with the entrance 19 of the fluid removal apparatus.

Once a container 2 is aligned with the entrance 19 of the fluid removal apparatus by the rotor 14, a ram 21 driven by pushing piston 20 presses on the rear of the container 2, which corresponds to a left to right action in FIGS. 1 and 5. In a preferred embodiment the pushing piston 20 and ram 21 push the container 2 forward into the entrance 19 of the fluid removal apparatus, and through a first sealing means, generally indicated as 22, attached to the first end, generally indicated as 24, of the sealed chamber, generally indicated as 26. During passage through the first sealing means 22, the container 2 is pierced by piercing means or opening forming means, generally indicated as 28 in FIG. 8.

As shown in FIG. 1, after passage of the containers 2 through the first sealing means 22 and piercing of the containers 2 by the opening forming means 28, the containers 2 travel along a predetermined path 16, suitably defined by guide means 34, conveniently in the form of a tube, in the direction of the second end of the sealed chamber, generally indicated as 32. As each container 2 is pushed by the pushing piston 20 into the first sealing means 22, it pushes before it the containers 2 that are ahead of it. As the containers 2 pass into the sealed chamber 26, they travel along that guide means 34 which permits fluid communication between the container 2 and the inside of the chamber 26. During passage through the sealed chamber 26 along the guide means 34, fluid exits from the containers 2. The guide means 34 continues along the predetermined path 16 and passes heating piping, generally indicated as 36, arranged around the predetermined path 16 where the temperature of the containers 2 is increased to provide more effective expulsion of fluid from the containers.

Although the guide means 34 in this preferred embodiment may be a slotted tube of ABS material, any alternative guide structure that permits travel of escaping fluids from containers 2 to the inside of the sealed chamber 26 is acceptable, including, for example, a stainless steel slotted tube, which has the advantage of increasing heat conduction to and from the containers 2, which tend to cool as a result of escaping fluids. The guide means 34 may also conveniently be a plurality of rods arranged lengthwise and parallel and spaced apart so that a container will not fall through as it travels along the path 16 defined by the rods. The spacing may be maintained by any well known means such as successive rings surrounding the predetermined path 16, each ring being attached to the rods.

Figure 14:
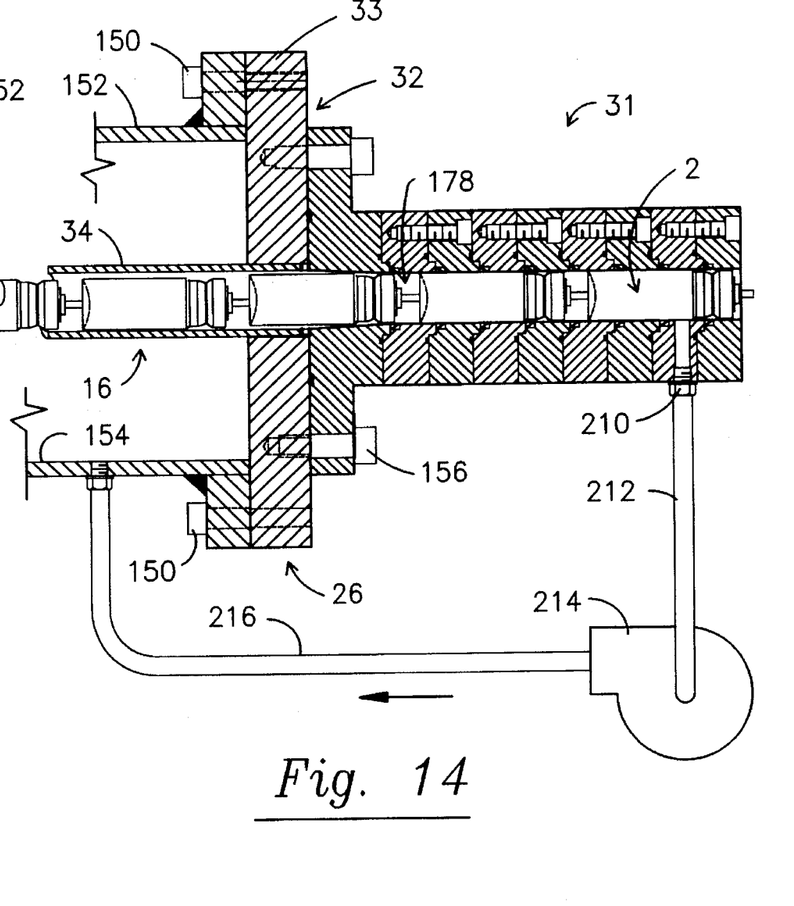
FIG. 14 is a fragmentary side sectional view of the structure surrounding the exit of the apparatus according to the present invention, taken along line 14—14 of FIG. 2.
Figure 15:
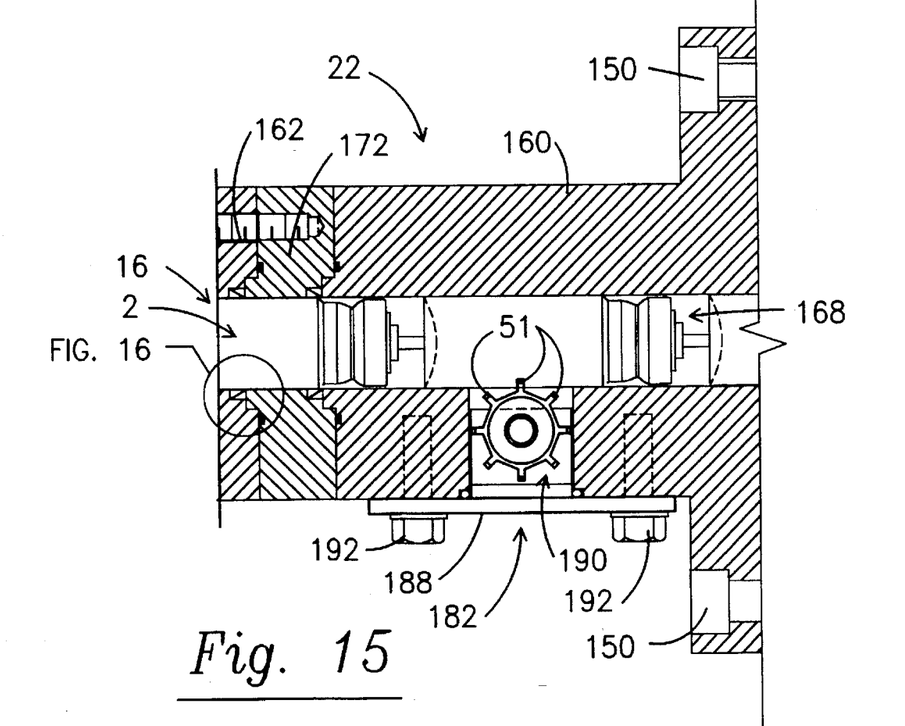
FIG. 15 is a fragmentary side sectional view showing the starwheel puncturing means of the present invention.
Figure 16:
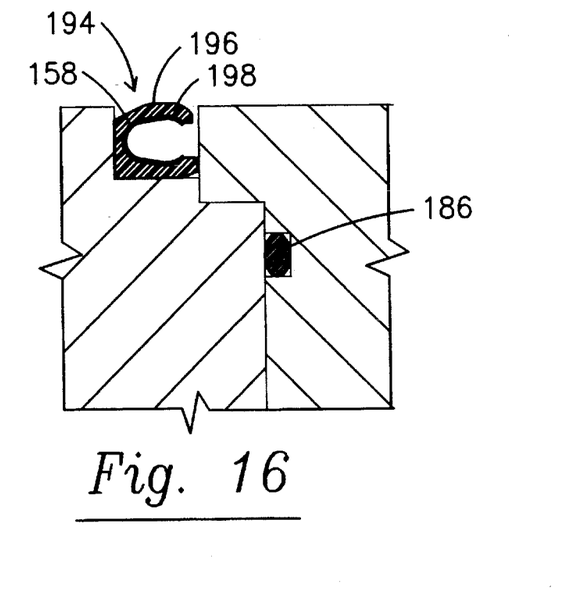
FIG. 16 is a fragmentary sectional view of the interface between two stackable sealing blocks showing a circumferential seal according to the present invention.

As shown in FIG. 14, when a container 2 reaches the second end 32 of the sealed chamber 26, such a container 2 is pushed into a second sealing means, generally indicated as 38, after which further travel leads to the container 2 dropping into the collecting bin 6. Although the collecting bin 6 has been described for a preferred embodiment, any other means for collecting and storing emptied pressurized containers 2 is suitable and will be readily apparent to those skilled in the art, including conveyor belts leading to compaction machines, bins, bins mounted on conveyor belts, etc.

Overview of Recovered Fluid Flow

Figure 3:
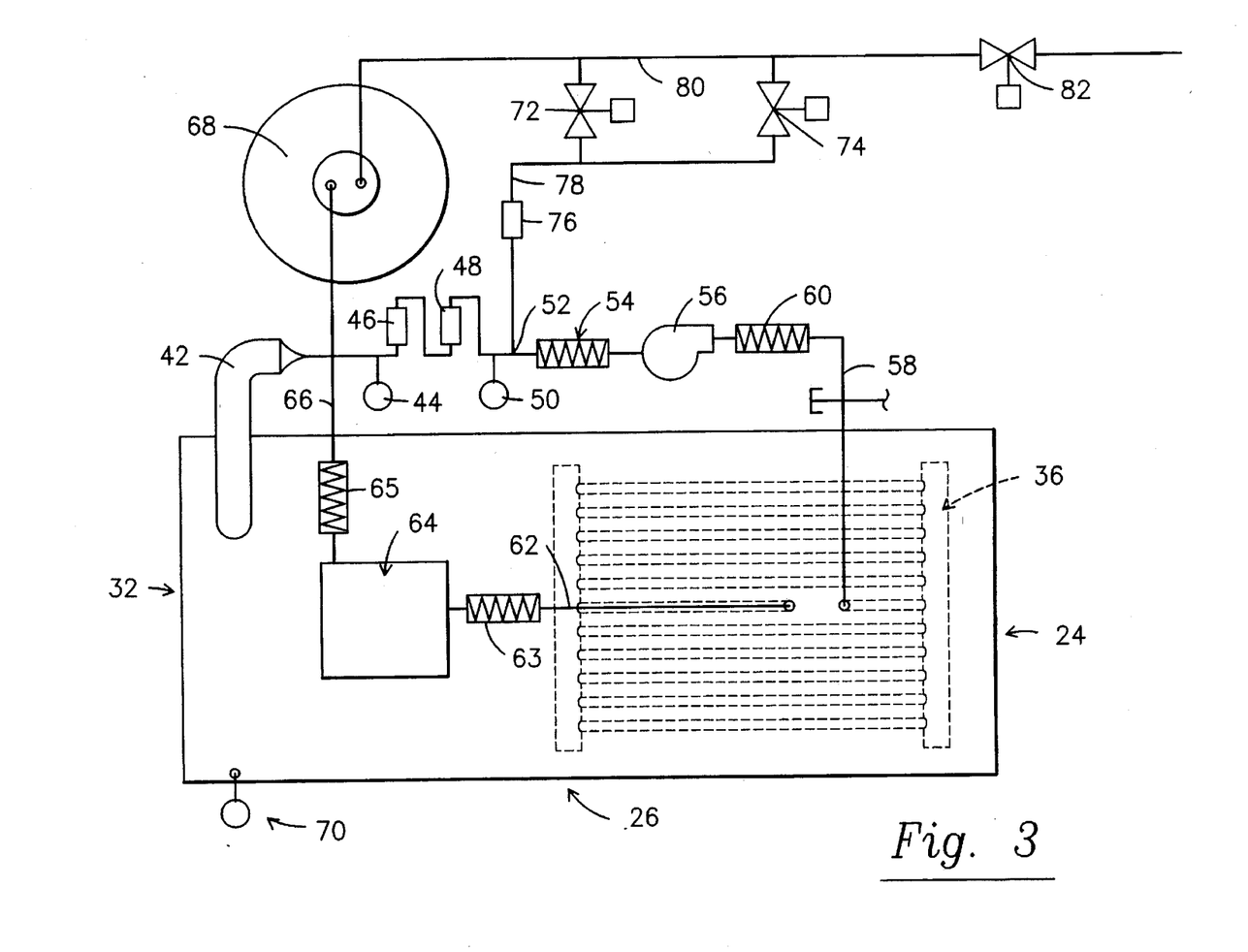
FIG. 3 is a schematic representation of the apparatus for practicing the present invention.

FIG. 3 is a schematic representation of the apparatus and procedure of a preferred embodiment of this invention in which the flow of recovered fluids or gases can be seen in overview. Gases or fluids that are removed from the sealed chamber 26 exit through an exit conduit 42 proximal to the second end 32 of the sealed chamber 26. The exit pipe 42 connects to a first pressure measuring means, such as meter 44, which will be used to monitor the pressure of the fluid across the first filter 46 and the second filter 48, through which the fluid flows. The first filter 46 and second filter 48 can be any well known means for filtering and removing impurities from a fluid, and the first filter 46 may conveniently be a 30μ filter while the second filter 48 may suitably be a 3μ filter. After passage through the first filter 46 and second filter 48, the fluid is conducted to a second pressure meter 50 and past a junction point 52. Although the first 44 meter and second pressure meter 50 are useful for monitoring the pressure difference across the first filter 46 and second filter 48, and therefore for monitoring the need for cleaning the first filter 46 and second filter 48, neither the first pressure meter 44 nor the second pressure meter 50 are required for successful operation of the invention.

From the junction point 52 the fluid may conveniently be conducted through a first vibration isolator, generally indicated as 54, to a fluid compressing means 56. This compressing means 56 compresses the fluid, raising its pressure and temperature and may suitably be any well known fluid pump. The fluid exits the compressing means 56 by piping or fluid conducting means 58 leading from the pumping means 56 through a second vibration isolator 60. The purpose of the first vibration isolator 54 and second vibration isolator 60 is to prevent vibration of the compressing means 56 from damaging any of the surrounding systems. The purpose of the first vibration isolator 54 and second vibration isolator 60 can be satisfied by suitable equivalents, such as clamping the piping on either side of the compressing means 56, placing flexible hosing on either side of the compressing means 56, or any other well known vibration damping means.

From the second vibration isolator 60 the piping leading from the piping means 58 passes into the sealed chamber 26 and leads the fluids into piping 36 arranged about one or more guide means 34 through which the pressurized containers 2 will travel. The piping 36 is operatively connected in a heat conducting relationship with he containers passing through the guide means 34. The effect on the fluid of the compressing means 56 is to increase its pressure and therefore its temperature. As a result, fluid that travels through the piping 36 arranged around a predetermined path 16, along which the containers 2 move, is hotter than its surroundings and is able to convey heat to the containers 2 traveling along the predetermined path 16.

Although the preferred embodiment has been depicted as having heating piping 36, any alternative means 36 for heating the containers is acceptable, including additional electrical heating means, and other well known means 36 for raising the temperature of containers 2. After passage through the heating piping 36 the fluid exits the sealed chamber 26 and travels along piping 62 leading to cooling means, generally indicated as 64. The piping 62 leads and connects the fluid into means 64 for cooling hot heating fluid, which may conveniently be any well known heat exchanger. From the cooling means 64 for reducing fluid heat the fluid travels along piping 66, returning to a gas storage tank, generally indicated as 68. In a preferred embodiment, piping 62 and 66 entering and exiting from cooling means 64 pass through vibration isolators 63 and 65 which prevent vibration of the cooling means 64 from damaging other parts of this invention. The gas storage tank 68 may be any well known tank capable of fluid storage. In a preferred embodiment the gas storage tank 68 can be a lowered pressure gas cylinder for receiving a fluid such as freon which is being removed by the present invention.

All of the piping described in this detailed description can be any well known structure for conducting fluid flow. A preferred embodiment involves the use of copper tubing capable of being welded or soldered into rigid shapes and of being Joined into other piping and into apertures.

In operation, fluid extracted from the sealed chamber 26 exits through the exit conduit 42, is filtered by the first filter 46 and second filter 48, and travels to the compressing means 56. Operation of the compressing means 56 increases both the pressure and the temperature of the extracted fluid, which temperature is partly released in the heating piping 36. Some of the remaining temperature of the extracted fluid is removed from the fluid in the cooling means 64 before the extracted fluid is finally deposited into the storage tank 68. During operation, to protect seals and the physical integrity of the sealed chamber 26, pressure in the sealed chamber 26, which preferably should be lower than atmospheric and must be lower than that in most of the pressurized containers 2, is metered using chamber pressure metering means, generally indicated as 70. The chamber pressure metering means 70 is used to observe the pressure within the sealed chamber.

During operation of the compressing means 56 the pressure within the sealed chamber 26 may and generally does drop below atmospheric. The sealed chamber 26 may buckle or lose seal integrity if the internal pressure is sufficiently below atmospheric. To prevent this, a first means 72 for connecting piping to the gas storage tank 68 is used. This first means 72 for connecting may suitably be a solenoid controlled valve, although any other suitable automatic or manual flow control system may be used. In addition to a first connection means 72, in the preferred embodiment there is a second, suitably similar means 74 for connecting piping to the gas storage container 68. Both first connecting means 72 and second connecting means 74 are switchable between a position of connection and a disconnected position. In a position of connection, the piping on either side of the first connecting means 72 and second connecting means 74 are in fluid communication with each other. In that position fluid can travel from the storage tank 68 along piping 80, through the first connecting means 72 or the second connecting means 74, along piping 78, through a third filter 76, and to the Junction 52, which may thus provide feedback pressure to junction 52. The feedback piping 80 not only connects the first connecting means 72 and the second connecting means 74 to the storage tank 68, but also to a venting valve 82, which may conveniently be either automatically or manually controlled. The venting valve 82 permits venting of dangerously high or dangerously low pressures to prevent catastrophic and/or dangerous system failures. In this preferred embodiment a liquid storage tank 200 may be placed in fluid communication with the bottom interior of the sealed chamber 26, as shown in FIG. 1.

When the present invention is not in operation, and specifically after use of the present invention, the temperature in the sealed chamber 26 tends to raise, thereby increasing the pressure of any remaining fluids and the gases in the seal chamber 26. To prevent possible damage to the sealed chamber 26 or other parts of the present invention, a fluid recovery unit, which is an off-the-shelf device, may be used to remove fluids when the pressure within the sealed chamber exceed a preset level. In a preferred embodiment, the fluid recovery unit 43 may be a Dwyer freon recovery unit with a diaphragm set so that the unit will activate when pressure in the sealed chamber exceeds 0.25 psi (pounds per square inch atmospheric) below atmospheric.

Any conventional source of electrical power may be utilized to provide operating power to the various components of this apparatus.

Pressure Control System

Figure 4:
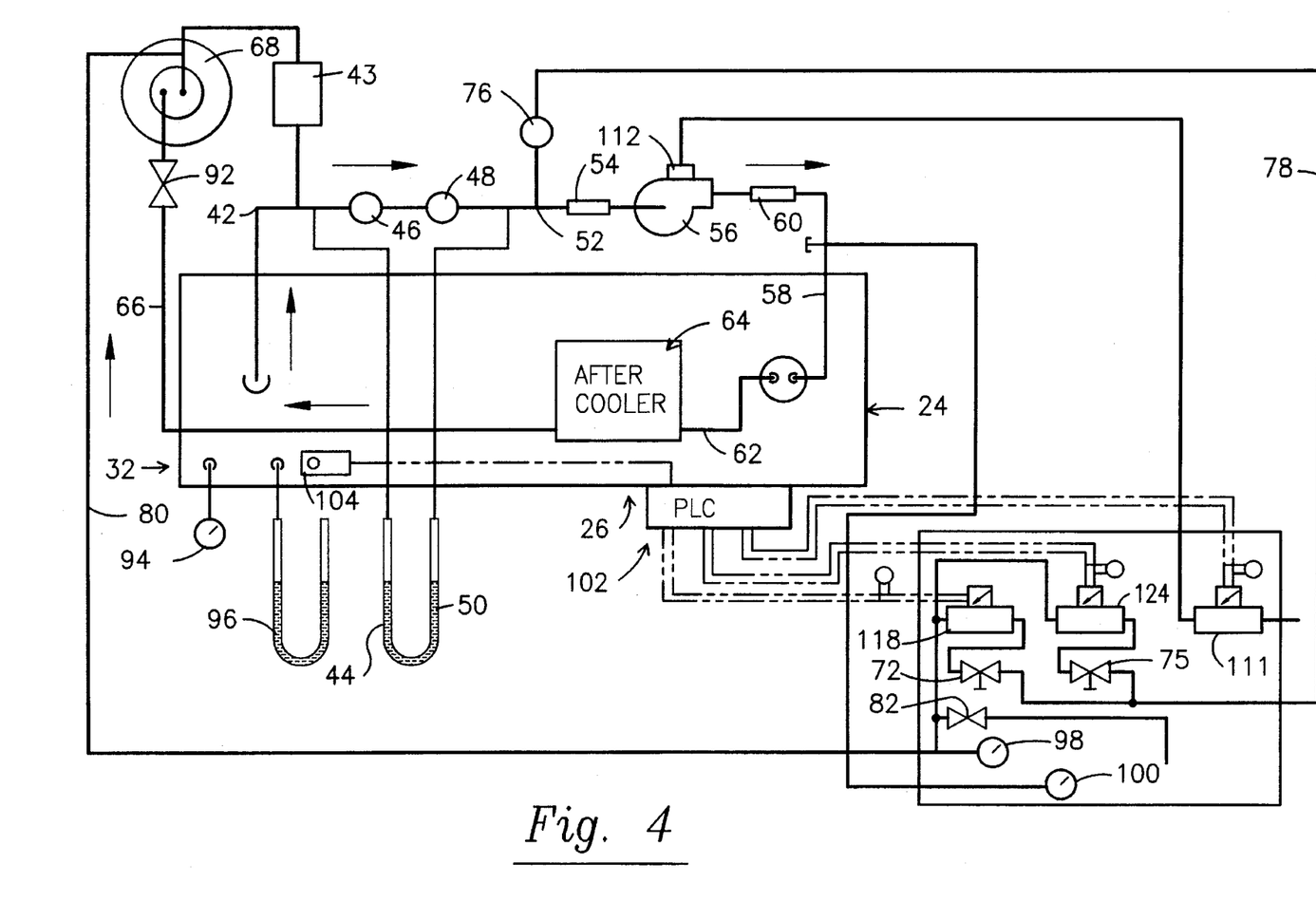
FIG. 4 is a schematic representation of the fluid flow of the method of this invention.

FIG. 4 provides greater detail of the pressure control system of the preferred embodiment. When the present invention is not in operation, the gas storage tank 68 may conveniently be sealed from leakage into or from the cooling unit 64 by a sealing valve 92, although the presence of this sealing valve 92 is not essential to the present invention.

The chamber pressure metering means 70 (FIG. 3) can be constructed as a combination of a readout pressure meter 94, or any other means 26 for accurately reading the pressure within the sealed chamber, and a mercury pressure meter 96, or any other means 96 for quickly reading the pressure within the sealed chamber 26. In combination, the two tank metering means 70 provide both accurate and quick pressure readings. In a preferred embodiment the feedback piping 80 is attached to a tank pressure meter 98. Attached to the piping leading 58 from the pumping means 56 is a pump pressure meter 100. Both the tank pressure meter 98 and the pump pressure meter 100 may conveniently be implemented using any well known means for monitoring pressure.

Various tank pressure control means known to the art are suitable for the present invention. In this preferred embodiment as shown in FIG. 4, automatic monitoring and maintenance of the pressure within the sealed chamber 26 is achieved using a programmed logic controller, generally indicated as 102 (abbreviated to "PLC" within this detailed description). The PLC 102 monitors the pressure within the sealed chamber 26 in the preferred embodiment by means of a program detailed by overall flow charts in FIGS. 17 and 18. A PLC pressure meter 104 indicates the pressure within the sealed chamber 26 and is continuously metered as shown in box 106. If the metering indicates that the pressure in the sealed chamber 26 drops below a first absolute pressure threshold, preferably about 14.58 psia (pounds per square inch atmospheric), based on a comparison performed in box 108, then the PLC signals in box 110 a pump idle controller 111, which, by use of a compressing means switch 112 switches the compressing means 56 into an idle state. The PLC 102 then compares against a second absolute pressure, preferably about 14.57 psia, shown in box 114. If the sealed chamber 26 pressure is generally at or above the second pressure then the PLC 102 returns to monitoring the PLC pressure meter 104, in boxes 106 and 108 et seq. If the comparison of box 114 indicates that the pressure in the sealed chamber 26 lies generally below the second pressure then the PLC 102 initiates a first feedback, as shown in box 116. The PLC 102 signals a first valve controller 118 which opens the first means 72 for connection and permits a first avenue for feedback.

Figure 17:
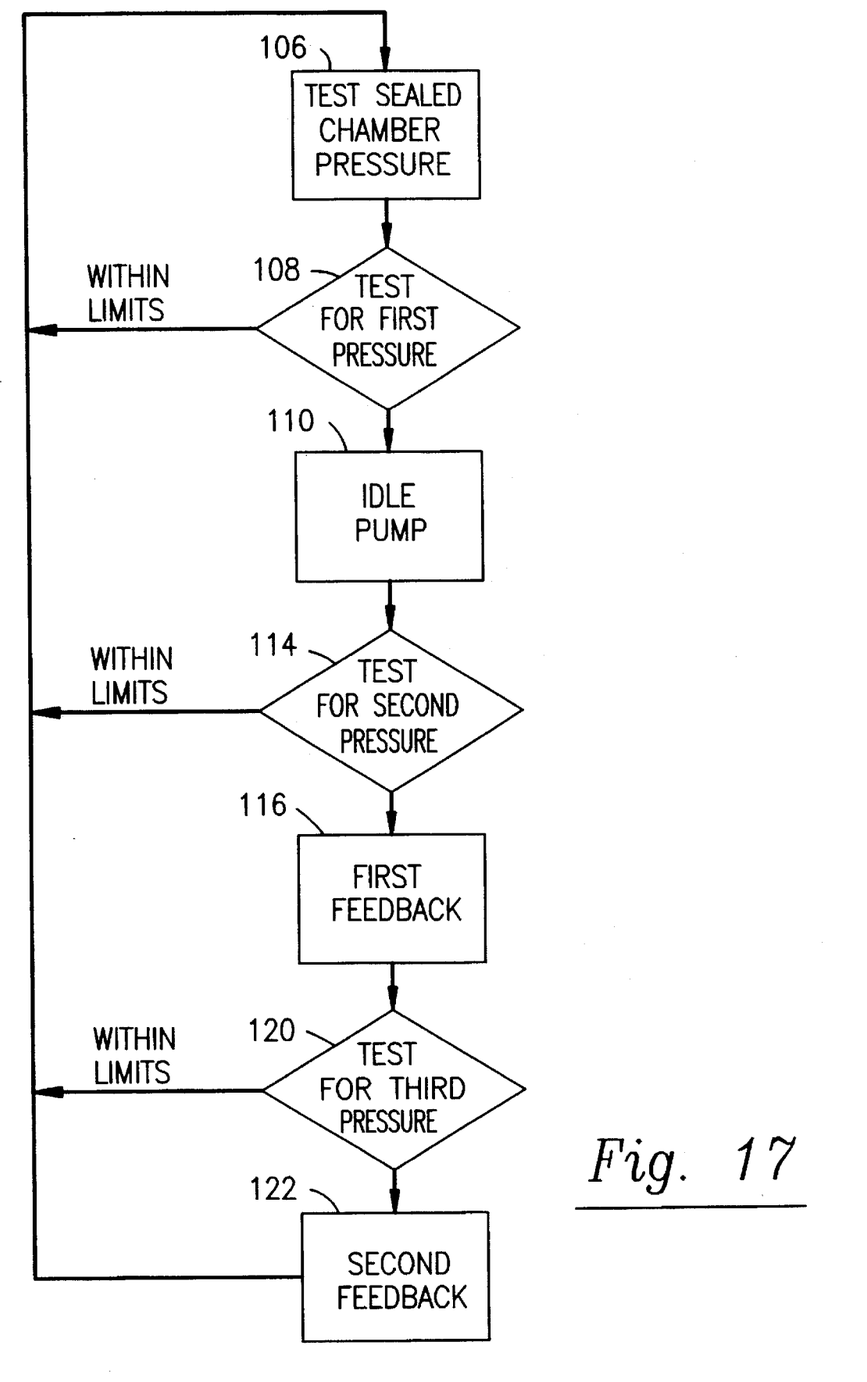
FIG. 17 is a flow chart illustrating the steps of pressure control followed by the programmed logic controller.

The PLC 102 then compares the pressure in the sealed chamber 26 against a third absolute pressure, preferably about 14.27 psia, as shown in box 120. If the sealed chamber pressure lies generally at or above the third pre s sure, then the PLC 102 returns to metering, as shown in box 106, and continues testing the pressure in the sealed chamber 26. If, however, the pressure in the sealed chamber 26 lies generally below the third pressure, then the PLC 102 initiates a second feedback, as shown in box 122. The PLC 102 signals a second valve controller 124 which opens the second means 74 for connection and permits a second avenue for feedback.

Figure 18:
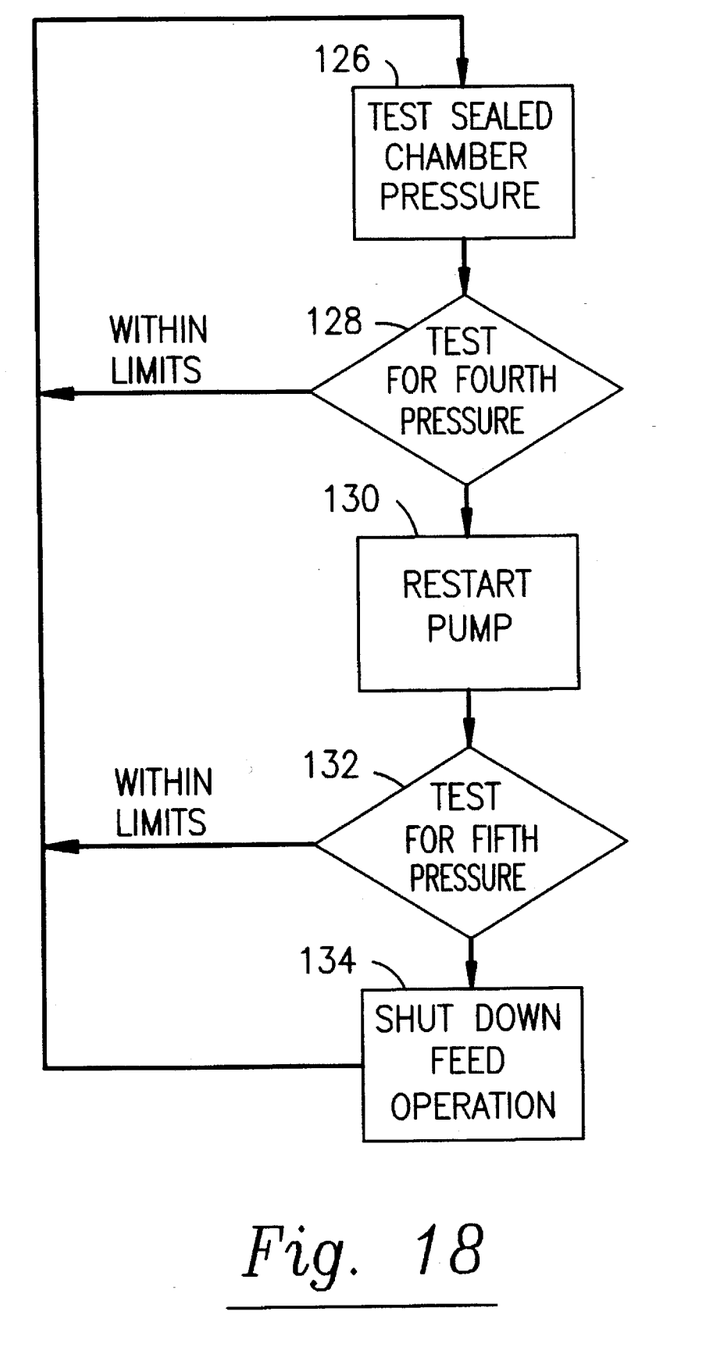
FIG. 18 is a flow chart illustrating the steps of pump and feed control followed by the programmed logic controller.

In FIG. 18 the PLC 102 measures the sealed chamber pressure, as shown in box 126, and tests for a pressure in the chamber above 14.54 psia (absolute), as shown in box 128, in which case the pump is re-started if it-is stopped at the time of the test as shown in box 130. In this case, the PLC 102 tests against a fifth pressure of 14.90 psia absolute, as shown in box 132. If the pressure in the chamber exceeds the fifth pressure, the PLC 102 shuts down the feed process, as shown in box 134, and shuts off the supply of containers 2 at the retractor 136 or at any other convenient cutoff point in the feed system.

All of the above steps are performed automatically by the PLC 102, and may also be supplemented in unusual cases by manual use of the venting valve 82. All pressures given above are merely convenient values of a preferred embodiment. The invention will operate with other pressure values known to those skilled in the art.

Operation of the Slide, Rotor and Pushing Piston

FIG. 5 illustrates in greater detail a partial side sectional view taken along line 5—5 of FIG. 2 of the operation of the slide 10, the rotor 14, the rotary actuator 18, and the pushing piston 20 in action pushing pressurized containers 2 into the first sealing means 22.

Figures 19, 20, 21:
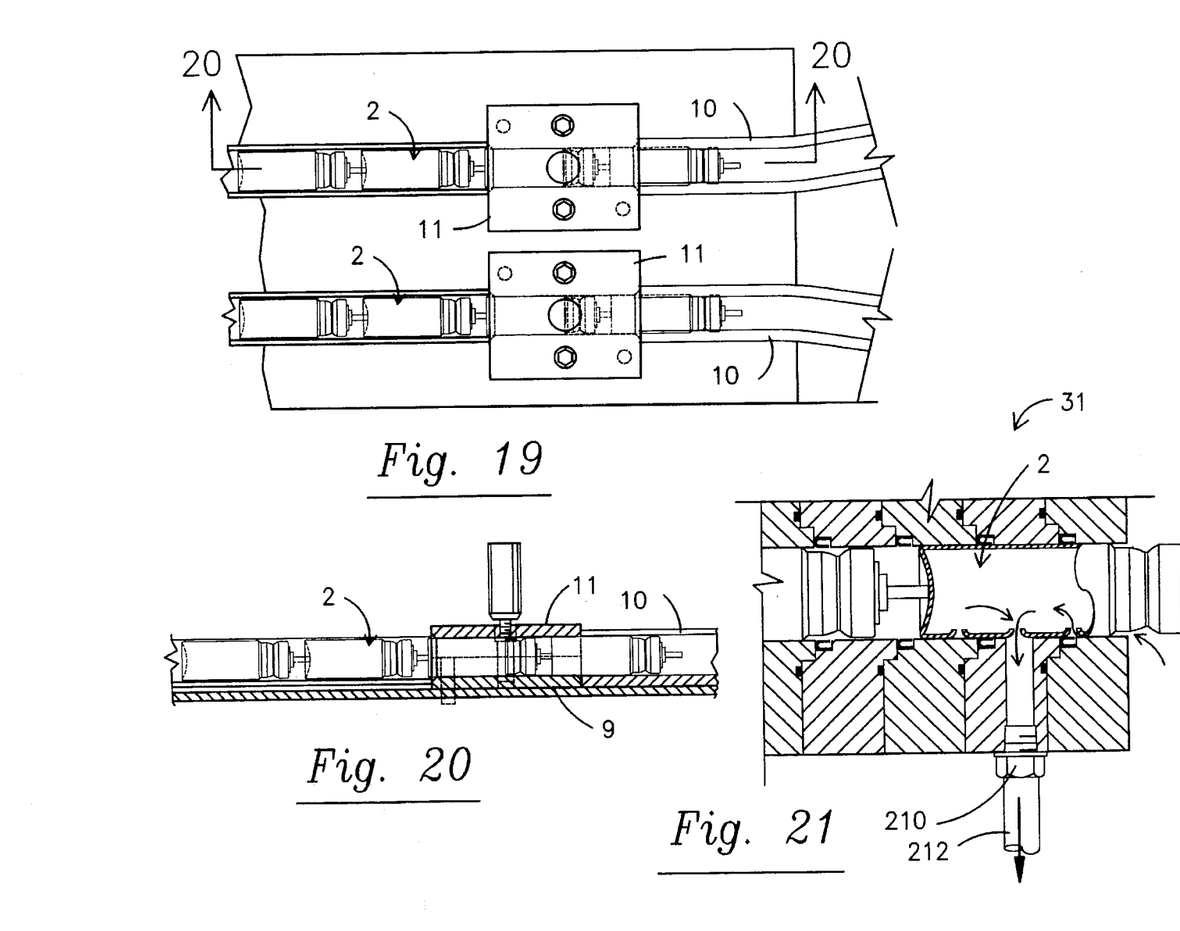
FIG. 19 is a fragmentary plan view showing the removable die of the present invention.
FIG. 20 is a fragmentary sectional view showing the removable die of the present invention.
FIG. 21 is a fragmentary side sectional view showing air flow in a preferred embodiment of the structure surrounding the exit of the apparatus according to the present invention.

From the vibratory feeder 8 containers 2 pass through a removable die seen in FIGS. 19 and 20, composed of a lower portion 9 and upper portion 11. The removable die can be any well known means of preventing passage of damaged containers, but may conveniently be a removable upper portion 11 which, in combination with a lower portion 9 defines an opening minimally larger than an undamaged and unwarped container 2. In combination, the lower portion 9 and upper portion 11 of the removable die prevent entrance into the present invention of damaged containers 2.

The vibratory feeder 8 may conveniently deliver containers 2 to the slide 10 in a valve-first alignment. Referring to FIG. 5, the containers 2 travel from left to right along the slide 10 until they hit a stop 138, which prevents motion of the container 2 beyond the point at which the rotor 14 can engage and move it. As the containers 2 travel down the slide 10 very close to or in contact with one another, to prevent the rotor 14 from snaring against the second container 2 being presented by the slide 14, a retractor 136 may conveniently engage the second container 2 and pull it back up the slide 10 before the operation of rotor 14. The retractor 136 may conveniently be a simple piston activated block with an opening slightly larger than an container 2.

FIG. 5 also depicts the manner of travel and spacing of containers 2 of two different sizes, which sizes are given only as examples of sizes of containers 2 which the present invention can handle. One of the novel and useful features of the present invention is its ability to handle varying lengths of containers 2 with no adjustment to the operation of the present invention.

Rotor Operation

Figure 6:
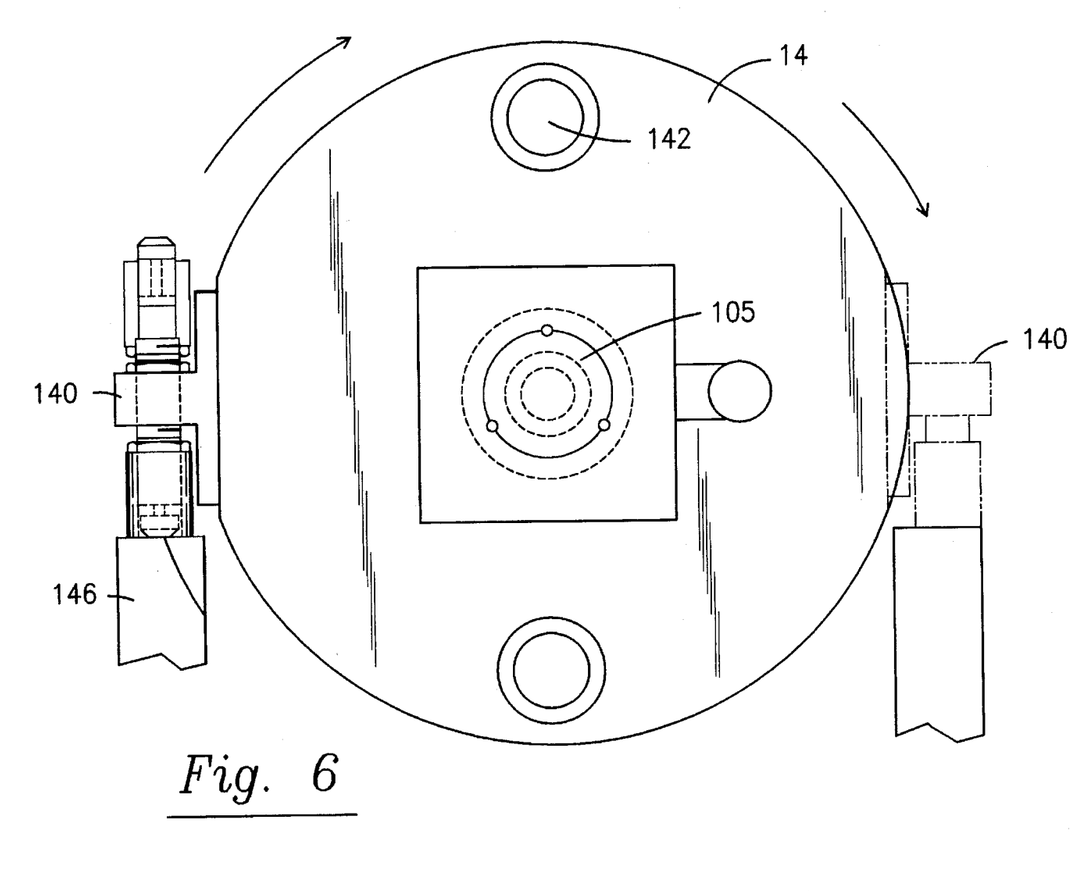
FIG. 6 is a rear elevation of the rotor which aligns the containers for the pushing piston of the present invention.
Figure 7:
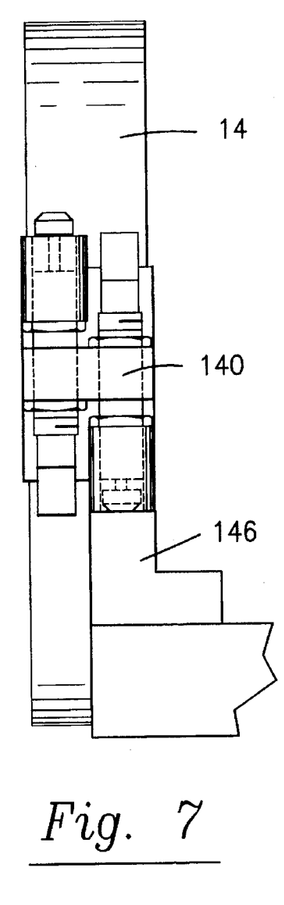
FIG. 7 is a side elevation of the rotor of FIG. 6.

From the slide 10 the containers 2 must be moved into alignment with the entrance 19 of the fluid removal apparatus. This may be done by alignment and moving means known to those skilled in the art. In a preferred embodiment, a rotor 14 and other systems may conveniently be used. Operation of the rotor 14 may conveniently involve oscillating motion of the rotary actuator 18 between a first position and a second position. The first position is illustrated in FIG. 6, a rear elevation of the rotor 14, and the arrows in FIG. 6 show the travel required of the rotor 14 to reach the second position. The rotor 14 has rotor shock absorbers 140 attached to it and the rotary actuator 18 action is simply one of forward, reverse, forward, reverse, etc., timed to coincide with the pushing piston 20. Once a container 2 has entered the container gripper opening 142 and hit the stop 138, the retractor 136 pushes back the second container 2, and the rotary actuator 18 turns the rotor 14 and the container 2 in the container gripper opening 142 in a clockwise direction as seen in FIG. 6 until the rotor shock absorbers 140 encounter the first shock absorbers stop 144. At this point the container 2 is aligned for the pushing piston 20 which will push the container 2 along the predetermined path 16 through use of a ram 21 at the tip of the pushing piston 20. Once the action of the pushing piston 20 is completed, the rotor 14, now no longer carrying a container 2 in the container gripper opening 142, is turned counter clockwise, as per FIG. 6 by the rotary actuator 18 until the rotor shock absorbers 140 encounter the second shock absorber stop 146. At this point the container 2 loading cycle starts again. FIG. 7 presents a side detail view of the rotor 14.

Both the rotary actuator 18 and the pushing piston 20 may conveniently be supplied with any well known source of power suitable to the purposes of the present invention. The pushing piston 20 may conveniently be any device known to the art capable of extension and retraction in a forceful manner.

Chamber Container Seals

Figures 8, 9, 10, 11, 12:
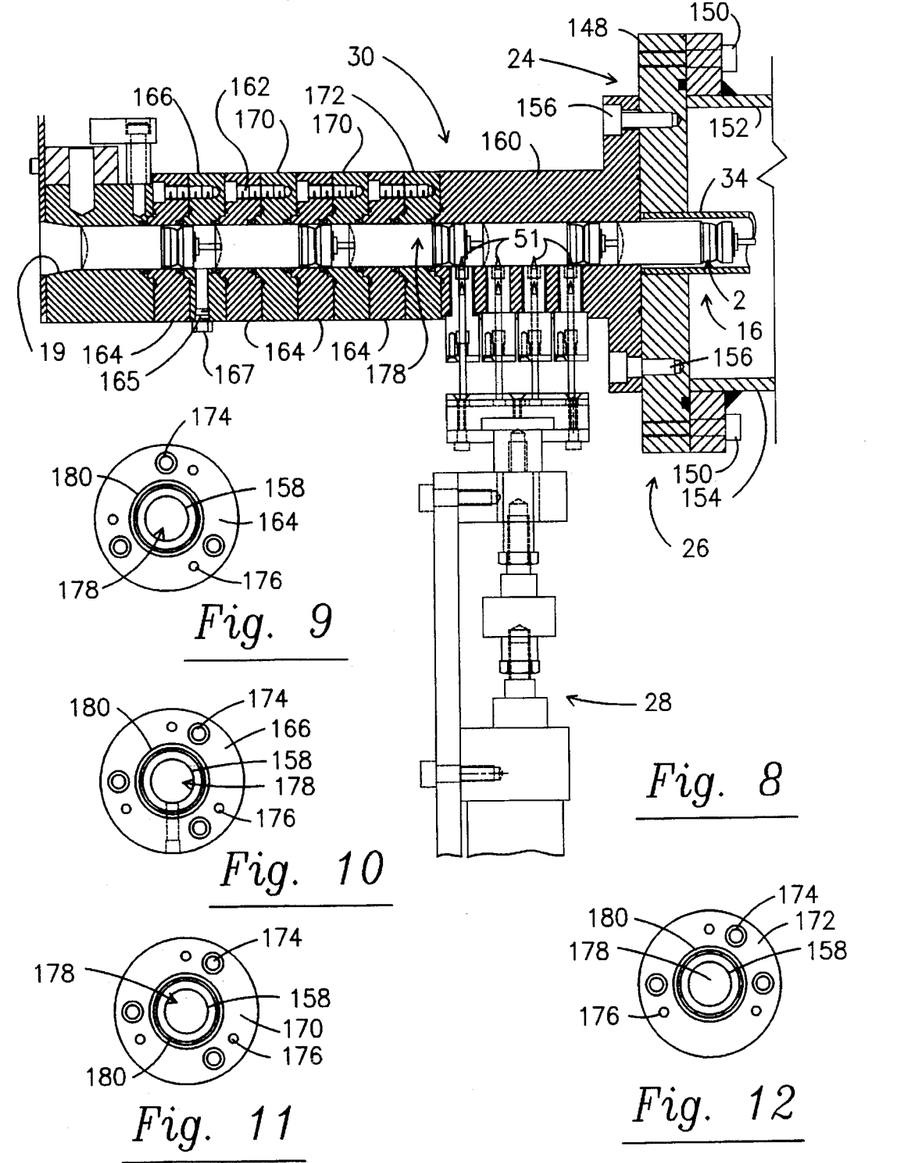
FIG. 8 is a fragmentary side sectional view of the structure adjacent the entrance into the apparatus of this invention, showing the needle/piston puncturing means of the present invention, taken along line 8—8 of FIG. 2.
FIGS. 9–12 are front elevations of the stackable seals of FIG. 8.

In FIG. 8 a partial side sectional view of the first end 24, or entrance, of the sealed chamber 26 is depicted. The sealed chamber 26 has a first end wall 148 attached by bolts 150 to an upper wall 152 of the sealed chamber 26 and a lower wall 154. The first end wall 148 has an opening to permit the containers 2 to pass through it, along guide means 34.

The seal assembly or seal block, generally indicated as 22, provides a sealing means that attaches to the first end wall 148 by fasteners, such as bolts 156. Although the means for sealing may conveniently be a solid block with an opening through a long axis of the block for the passage of containers 2, within which opening circumferential seals 158 are spaced by some spacing means such as cut sections of piping large enough to permit passage of the containers 2, these may satisfactorily involve stacked sealing blocks attached to the end block 160 by fasteners 162. The preferred embodiment involves eight stackable sealing blocks of four different designs. The first stackable sealing block 164 design (FIG. 9) forms the first, third, fifth, and seventh sealing block 164 encountered by a container 2 as it is pushed along the predetermined path 16. The second sealing block 166 design is used in the second position and may conveniently have a monitoring opening 165 substantially towards its bottom from the inside of the block opening, generally indicated as 178, to the outside of the stackable sealing block 166 (FIG. 10). The opening 165 is plugged for subsequent use by plug 167 and may be used for monitoring pressure within the seal assembly 22 or for injecting lubricants. A third stackable sealing block 170 design (FIG. 11) occurs at the fourth and sixth position, and a fourth stackable sealing block 172 design (FIG. 12) is found at the eighth (and last) position of the preferred embodiment of the seal block 22. The different sealing block designs permit bolts 162 to connect the sealing blocks to each other. A bolt 162 connects a first bolt hole 174 to a second bolt hole 176 in each of the adjacent blocks and forms a rigid structure from the stackable sealing blocks.

Each stackable sealing block may conveniently hold within it a circumferential seal 158 that maintains pressure and atnospheric integrity within the sealed chamber 26 during passage of containers 2. To prevent loss of pressure and atmospheric integrity from within the predetermined path 16, from the series of central openings 178 to the outside of the means 22 for sealing, interblock seals, or means for sealing between the blocks, 180 are used. The seals 180 connect to adjacent blocks and form a seal between adjacent blocks.

The second sealing means 38 functions as does the first sealing means 22 and may conveniently have the same components. The second sealing means 38 is attached to the second end 32. Containers 2 pass through the second sealing means 38 before final exit from the sealed chamber 26. The second sealing means 38 is depicted in FIG. 14, a partial side sectional view of the sealed chamber 26 taken along line 14—14 of FIG. 2.

As seen in FIG. 14, the opening 210 in the second sealing means 38 may conveniently be used for piping 212 leading to any well known pumping means 214 which draws fluid from the exit seal assembly 38 or second sealing means 38 and drives it through piping 216 and back into the sealed chamber 26. As a container 2 passes through the final circumferential seal 158, as seen in FIG. 21, fluids from the outside atmosphere enter the container 2 with a low interval pressure and gather the residue of fluids remaining in the container 2. For more effective evacuation, the incoming atmospheric gases may conveniently be used in combination with a pump 214 to flush the last remaining residue of fluids from the container 2.

Circumferential Seal

Although any well known circumferential seal 158 may be employed to prevent leakage of pressure during passage of containers 2 through the seal assemblies 22 and 38, a preferred embodiment involves the use of U-shaped cross sectional annular seals 158 such as those disclosed in U.S. Pat. No. 4,508,356 and shown in FIG. 16. These means 158 for circumferentially engaging containers 2 may conveniently fit into an annular circumferential space, generally indicated as 194, in the stackable sealing blocks. As depicted in a partial detail sectional view in FIG. 16, the U-shaped cross sectional seals 158 have the advantage that containers 2 which pass through the seal 158 cannot engage a lip 196 of the seal 158. The seal 158 may be made of any wear resistant material that also provides a seal, and it should have a deformation resistant U-shaped cross sectional spring 198 inside. The seal 158 sealingly engages the outer surface or sidewall of containers 2 so as to maintain a seal as they pass.

Sealed Chamber Construction

The sealed chamber 26 may be made of any well known impermeable rigid or resilient material and must be large enough to house the guide means 34 and the heating piping 36, and rigid enough to support the first 22 and second sealing means 38.

A preferred embodiment involves four sheet steel walls welded into a rectangular chamber. Two end walls fit onto the first 24 and second end 32 and are bolted on. Both ends are substantially identical. The second end is shown in the side sectional view of FIG. 14. The first end wall 148 is depicted in FIG. 8. The first end wall 148 is attached by bolts 150 to an upper wall 152 and lower wall 154 of the rectangular chamber. By welding the chamber 26 or other suitable means, an airtight seal is achieved.

Although the sealed chamber 26 may conveniently be a rectangular chamber, the invention can suitably be practiced with any number of configurations, including a tubular sealed chamber. In this embodiment, one or more tubes are used to contain the guide means 34. These tubes may be any commercially available air tight tubes, and may conveniently include four inch diameter tubing, and be sealed against the atmosphere. Although a rectangular chamber and one or more sealed tubes are suggested alternatives, any means for controlling the atmospheric environment of the punctured containers known to those skilled in the art will satisfy the requirement of the present invention for a sealed chamber 26.

Puncturing Means

Figure 13:
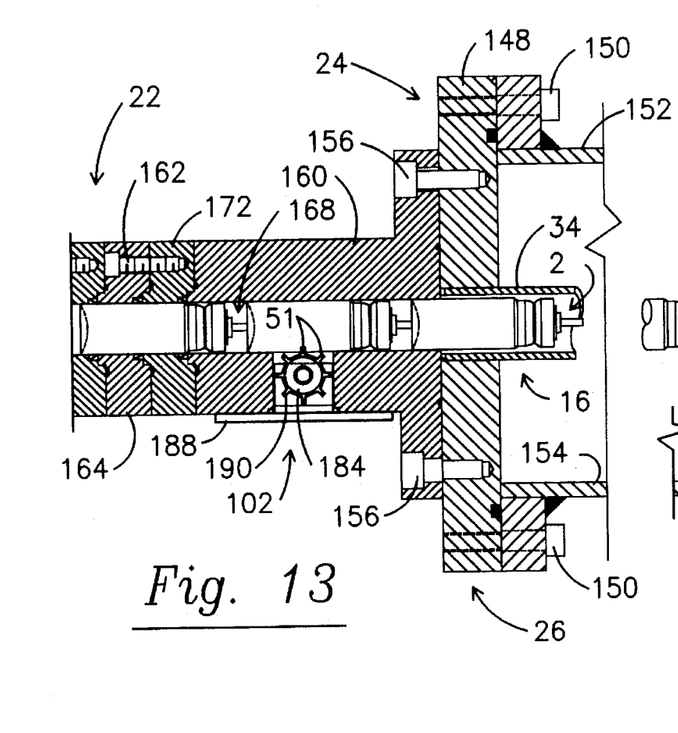
FIG. 13 is a fragmentary side sectional view of the structure adjacent the entrance into the apparatus of this invention, showing the starwheel puncturing means of the present invention.

In FIG. 8 a piston/needle embodiment of the means for piercing the containers 2 is shown, generally indicated as 182. In FIG. 13 an alternative means 182 for piercing is shown in a partial side sectional view of the sealed chamber 26 using a starwheel 184 having sharp points 186. In both embodiments the containers 2 are punctured while passing over the piercing assembly 182. Both embodiments are sealed against leakage of fluids from the sealing assembly 22. In the case of the starwheel 184, which is the preferred embodiment, a sealing plate 188 is used to cover the starwheel recess, generally indicated as 190. The starwheel 184 turns inside the starwheel recess 190 about its own axis and pierces containers 2 as they pass. The sealing plate 188 may conveniently be attached to the end block 160 by sealing plate screws 192.

Although the starwheel recess 190 has been depicted and described as being in the seal block 160, it is equally suitable to the purposes of the current invention that the starwheel 184 be mounted by well known means to the guide means 34 or to some other point along the predetermined path 16 within the sealed chamber 26. Any other placement of the means 182 for piercing is also acceptable, it being desirable that the means for piercing 182 be so placed that escaping fluids are not permitted to enter the atmosphere.

A starwheel 184 implementation may conveniently use a torque motor such as an air torque motor to aid in turning the starwheel 184. Such a motor may optimally provide from 30–35 foot/pounds of torque to the starwheel 184.

While the foregoing describes in detail several preferred embodiments of the method for piercing pressurized containers and removing fluids from the containers of this invention, it is to be understood that such description is illustrative only of the principles of the invention and is not to be considered limitative thereof. Because numerous variations and modifications of both the method of container fluid removal and the apparatus therefor will readily occur to those skilled in the art, the scope of this invention is to be limited solely by the claims appended hereto.

What is claimed is:

1. A method of removing fluid from sealed, pressurized containers, comprising the steps of:
   introducing said containers into the interior of a chamber having:
   a first pressure therewithin lower than the pressure within said containers,
   said chamber including a first end for said introduction of said containers thereinto and a second end for removal of said containers therefrom;
   sealingly engaging the exterior of each said container as it is so introduced in order to prevent leakage of pressure between said chamber interior and the exterior environment;
   forming at least one opening in each said container sufficient to permit fluid within said container to pass out of said container through said opening;
   guiding said opened container along a continuous path within said chamber while maintaining within said chamber said first pressure such that fluid within an opened container passing through the chamber will flow into the chamber; and
   removing said containers from said second end of said chamber while sealingly engaging said container exterior in order to prevent leakage of pressure between said chamber interior and said exterior environment.

2. The method of claim 1 further comprising the step of heating said opened containers.

3. The method of claim 1 wherein said first pressure within said chamber is maintained at lower than atmospheric pressure.

4. The method of claim 1 further comprising the step of withdrawing from said chamber fluid flowing from said opened containers.

5. The method of claim 4 wherein liquids from said opened containers are recovered into a liquid storage tank.

6. The method of claim 4 wherein gases from said opened containers are recovered into a gas storage tank at a controlled rate of withdrawal.

7. The method of claim 6 wherein:
   said gases from said opened containers are filtered and then recovered into said gas storage tank; and
   said rate of withdrawal is controlled to maintain the pressure in said chamber within a predetermined range.

8. The method of claim 7 wherein a portion of said gases from said opened containers is used for heating said opened containers before being recovered into said gas storage tank.

9. The method of claim 8 wherein said gases are compressed, such that pressure and temperature of said gases increase, said gases then being used for said heating of said opened containers.

10. An apparatus for removing fluid from a sealed, pressurized container, comprising:
    a chamber having a first end for introduction of said containers thereinto and a second end for removal of said containers therefrom;
    first sealing means attached to said chamber proximal said first end for sealingly engaging the exterior of said containers passing therethrough, such that the exterior of said chamber is sealed against pressure leakage as said containers are so introduced thereinto;
    second sealing means attached to said chamber proximal said second end for sealingly engaging the exterior of said containers passing therethrough, such that the interior of said chamber is sealed against pressure leakage as said containers are so removed therefrom;
    means for introducing said containers through said first sealing means into said first end of said chamber;
    means for forming at least one opening in each said container sufficient to permit fluid within said container to pass out of said container through said opening;
    means for maintaining the pressure within said chamber at a level lower than the pressure within said sealed containers, such that fluid from an opened container passing through said chamber will flow into said chamber; and
    means for guiding said opened containers along a predetermined path through said chamber and out said second end thereof, whereby fluid from an opened container within said chamber will flow into said chamber prior to passage of said container out said chamber second end.

11. The apparatus of claim 10 wherein
    each of said containers have a generally cylindrical sidewall; and
    said second sealing means comprises means for circumferentially engaging said sidewall of each said container passing out said chamber second end.

12. The apparatus of claim 10 wherein
    each of said containers have a generally cylindrical sidewall; and
    said first sealing means comprises means for circumferentially engaging said sidewall of each said container passing into said chamber first end.

13. The apparatus of claim 10 wherein
    each said containers have a generally cylindrical sidewall; and
    sealing means each comprise means for circumferentially engaging said sidewall of each said container passing into said chamber first end and out said chamber second end.

14. The apparatus of claim 13 wherein said means for circumferentially engaging said sidewall comprises:
    a sealing element having a first end and a second end, and an aperture extending therethrough and generally aligned with said aperture being configured and dimensioned to confirm generally with said container sidewall, said sealing element being attached to said chamber first end;

at least two circumferential seals, disposed within said aperture for sealingly engaging said container sidewalls, whereby pressure leakage in said chamber is reduced during passage of said containers therethrough; and means for spacing said circumferential seals from each other.

15. The apparatus of claim 14 wherein said sealing element comprises:

at least two stackable sealing members engaging one another, each of said sealing members having said aperture extending therethrough such that said containers pass through said apertures of said sealing members said sealing members providing said means for spacing said circumferential seals from each other.

16. The apparatus of claim 10 further comprising means for heating said containers within said chamber.

17. The apparatus of claim 16 wherein said heating means comprises:

means for compressing heating fluid, to increase the temperature and pressure thereof;

first fluid conducting means leading from said compressing, said fluid conducting means piping then being operatively connected in a heat conducting relationship with said predetermined path, whereby said containers are heated;

means for cooling hot heating fluid, to reduce pressure and temperature of the heating fluid; and second fluid conducting means then connected to said cooling means, whereby said heating fluid is cooled and reduced in pressure, said second fluid conducting means then connected substantially to a second storage tank for reception of said fluid.

18. The apparatus of claim 10 wherein said guiding means comprises means for supporting said opened containers passing through said chamber while permitting substantially free flow of fluids from within said opened containers into said chamber.

19. The apparatus of claim 18 wherein said guiding means comprises a tube having openings in the outer wall thereof.

20. The apparatus of claim 10 wherein said means for forming said opening in each said container comprises perforating means.

21. The apparatus of claim 20 wherein said perforating means comprises a starwheel having sharp points, and being positioned along said predetermined path, such that each said container passing along said path will engage said sharp points and be pierced thereby.

22. The apparatus of claim 10 further comprising means for withdrawing from said chamber fluid flowing from said opened containers into said chamber.

23. The apparatus of claim 22 wherein said fluid withdrawing means comprises means for withdrawing liquids from said chamber into a first storage tank.

24. The apparatus of claim 23 wherein said fluid withdrawing means comprises means for withdrawing gases from said chamber into a second storage tank.

25. The apparatus of claim 24 further comprising:

means for compressing heating fluid, to increase the temperature and pressure thereof;

first fluid conducting means leading from said compressing, said fluid conducting means piping then being operatively connected in a heat conducting relationship with said predetermined path, whereby said containers are heated;

means for cooling hot heating fluid, to reduce pressure and temperature of the heating fluid; and second fluid conducting means then connected to said cooling means, whereby said heating fluid is cooled and reduced in pressure, said second fluid conducting means then connected substantially to a second storage tank for reception of said fluid.

26. The apparatus of claim 25 further comprising means for maintaining a pressure in said sealed chamber within a predetermined range.

27. The apparatus of claim 26 further comprising:

means for engaging and disengaging said means for compressing according to the pressure inside said chamber; and means for selectively connecting said fluid conducting means to said second storage container, said connecting means switchably permitting fluid communication between said fluid conducting means and said second storage container, whereby the pressure inside the chamber is further controlled.

* * * * *